US006514592B1

(12) United States Patent
Hubbard et al.

(10) Patent No.: US 6,514,592 B1
(45) Date of Patent: Feb. 4, 2003

(54) FRICTION ENGAGING DEVICE

(75) Inventors: David A. Hubbard, Wirral (GB); Alfred J. Taylor, Neston (GB); John C. Watson, South Wirral (GB)

(73) Assignee: Sab Wabco Products Limited, Bromborough (GB)

( * ) Notice: Subject to any disclaimer, the term of this patent is extended or adjusted under 35 U.S.C. 154(b) by 0 days.

(21) Appl. No.: 09/077,437

(22) PCT Filed: Dec. 12, 1996

(86) PCT No.: PCT/GB96/03062
§ 371 (c)(1),
(2), (4) Date: Nov. 23, 1998

(87) PCT Pub. No.: WO97/22815
PCT Pub. Date: Jun. 26, 1997

(30) Foreign Application Priority Data

Dec. 15, 1995 (GB) .................................................. 9525622

(51) Int. Cl.$^7$ ........................ C04B 35/573; F16D 69/02
(52) U.S. Cl. .................... 428/66.2; 188/73.1; 188/73.2; 188/251 R; 188/251 A; 192/107 M; 428/408; 428/542.8; 428/698
(58) Field of Search ................................. 428/66.2, 408, 428/698, 542–8; 188/251 R, 73.1, 251 A, 73.2; 192/107 M

(56) References Cited

U.S. PATENT DOCUMENTS

| 4,544,412 A | * | 10/1985 | Veltri | 106/286.5 |
| 4,815,572 A | * | 3/1989 | Frosberg | 188/251 M |
| 5,007,508 A |   | 4/1991 | Lacombe | 188/251 A |
| 5,686,144 A | * | 11/1997 | Thebault | 427/282 |
| 5,725,077 A | * | 3/1998 | Taylor | 188/251 A |

FOREIGN PATENT DOCUMENTS

| DE | 44 38 456 A1 | 5/1996 |
| EP | 0 235 011 A1 | 9/1987 |
| EP | 0 300 756 A | 1/1989 |
| WO | WO 95/07418 | 3/1995 |

OTHER PUBLICATIONS

V. Dollhopf and W. Krenkel, VDI Berichte No. 1080, 1994, pp. 473–482; Development of Integral Light–Weight Structures from Fibre–Ceramics; pp. 1–10 English translation.
Database WPI, Derwent Publications Ltd., London, GB; AN 93–121619 XP002026843 & JP 05 059 350 A (Ibiden Co), Mar. 9, 1993.
Database WPI, Derwent Publications Ltd., London, GB: AN 93–096921 XP002026844 & JP 05 039 478 A (Ibiden Co), Feb. 19, 1993.
Database WPI, Derwent Publications Ltd., London, GB: AN 92–224095 XP002026845 & JP 04 153 291 A (Ohwada Carbon Kogyo), May 26, 1992.
Database WPI, Section ch, Week 8926 Derwent Publications Ltd., London, GB; Class A18, AN 89–188447 XP002026846 & JP 01 126 445 A (Ibiden Co Ltd., May 18, 1989.

* cited by examiner

Primary Examiner—Nasser Ahmad
(74) Attorney, Agent, or Firm—Pearne & Gordon LLP

(57) ABSTRACT

A friction engaging device, such as, for example a braking disc and a friction couple, brake disc/pad are disclosed. The friction engaging device is a carbon-ceramic composite comprising a carbon fibre network and a filler comprising silicon carbide. One device comprises, by weight, from 35–50% carbon fibre, 14–30% free carbon, 10–28% silicon carbide, 5–14% silicon and 5–14% silicon oxide. Also disclosed is a method of producing a friction engaging device in which a carbon-carbon composite comprising 10 to 60% by weight of a carbon fiber network and from 40 to 90% by weight free carbon is impregnated with silicon under conditions such that substantially all of the carbon fibre network remains as carbon fiber, and a proportion of the free carbon present in the volume is converted within the volume to silicon carbide by reaction with the silicon.

22 Claims, 3 Drawing Sheets

FRICTION ENGAGING DEVICE

The present invention relates to a friction engaging device, such as, for example, a braking disc for a friction brake or friction clutch.

More particularly the present invention relates to a high performance friction engaging device, such as, for example, a braking disc for use in a guided trackway vehicle.

BACKGROUND OF INVENTION

The choice of materials used for making friction engaging devices is determined by the conditions under which a vehicle will operate and other surrounding circumstances.

By way of example, trains or their rolling stock conventionally have disc brakes which utilise steel or cast iron braking discs. Using such steel braking discs, the current maximum performance for a conventional train brake is that proposed for a new high speed passenger train where the maximum energy per steel braking disc in one stop is 22 MJ, with an average deceleration calculated from 350 km/h to stationary of about 0.7 ms$^{-2}$.

For trains or their rolling stock, which can have multiple brakes comprising at least four axle mounted braking discs per axle, a low margin between recovered fares and operating costs means the market price of a braking disc is relatively low and the life time requirement for the braking disc is high.

Also at around 100 kg for a single braking disc, each axle may have 400 kg of braking discs. Thus a greater number of braking discs adds to the weight of an axle and the greater the weight of the axle the greater the resulting track damage. Furthermore, since a maximum of four steel braking discs, due to their bulk, can be mounted on an axle, it is not very easy to increase the vehicle speeds much beyond 350 km/h using steel braking discs.

It would therefore be a clear advantage to reduce the number and/or weight and/or the bulk of these braking discs and/or improve their performance.

For trains, emergency stops at maximum rating have to be achievable with subsequent normal braking of the vehicle continuing after without any re-fitting of service parts. Consequently, good wear characteristics are very important.

In contrast, the braking discs for an aircraft's brakes, are in part determined by the type of flights they undergo. A jumbo jet may have as many as 9×16 clutch braking discs which are made of carbon-carbon fibre ie. a carbon fibre reinforced carbon composite. The current maximum performance for such a carbon-carbon fibre clutch brake is 71 MJ with an average deceleration from about 290–320 km/h to zero of about 4.2 ms$^{-2}$, this being the performance required to cater with an aborted take-off. In contrast to a train, where subsequent normal braking with the same braking discs is required, the whole of the undercarriage of the aircraft, including the braking discs, has to be replaced after such an aborted take-off. Consequently, with an aircraft it is less important that the braking discs wear characteristics are poorer than those provided by steel braking-discs.

In aircraft where journey times are short and stops are frequent eg. a domestic shuttle operation, steel braking discs may be preferred as steel, unlike carbon-carbon fibre, does not give rise to judder and gives better wear characteristics thus making steel braking discs more economical despite the need for increased fuel load, due to heavier brakes.

The decreased weight of carbon-carbon fibre braking discs and their ability to operate at relatively high temperatures makes them attractive for use on other vehicles. So why not use carbon-carbon fibre for the braking discs to be used on train brakes? This has indeed been tried with little success due to a lack of frictional stability and a poor wear life under operational conditions.

To explain, the dry friction behaviour of carbon-carbon fibre is complex. It exhibits unstable friction at low temperatures (less than 300° C.) and the wet friction can be very low ($\mu$=0.05) at ambient temperatures. Wear behaviour is poor at low speeds and low temperatures (called snub stops) due to high friction and also at high temperatures (greater than 600° C.) due to oxidation. The above currently makes carbon-carbon fibre braking discs unsuitable for use on trains. In aircraft snub stops cause a lot of judder, primarily experienced when an aircraft is taxiing. The wear caused by such snub stops is often large compared to wear caused by landings at much higher energy levels. Overcoming this problem would therefore be of benefit to the aircraft industry. Also very high energy stops cause excessive wear owing to oxidation of the carbon which begins at 500° C. and rapidly accelerates as the temperature increases. Despite these observations carbon-carbon fibre is a useful material for braking discs where the majority of braking is done with the braking discs at middle range temperatures (say, 250° C. to 600° C.), which is the case for aircraft landings and Formula One racing cars. Also, these vehicles have disc brakes which are enclosed so that the braking discs do not get intermittently wet in service.

All of these factors means that generally different materials are preferred for the braking discs of trains and aircraft due to the different operational conditions they experience.

SUMMARY OF THE INVENTION

It is an aim of the present invention to develop a friction engaging device which overcomes at least some of the abovementioned problems and/or disadvantages of the prior art devices.

According to a first aspect of the present invention there is provided a friction engaging device in the form of a carbon-ceramic composite comprising a carbon fibre network and a filler comprising silicon carbide.

Such a composition can be made utilizing a number of known processes.

In one embodiment the carbon-ceramic composite comprises, by volume, 10 to 60% of a carbon fibre network and up to 90% by volume of a filler comprising silicon carbide.

The filler may comprise a volume of air (porosity).

According to a second aspect of the present invention there is provided a friction engaging device in the form of a carbon-ceramic composite consisting a carbon fibre network and a filler.

Preferably the filler consists essentially of silicon carbide. Alternatively the filler may consist of silicon carbide, silicon oxide, silicon and free carbon.

In another embodiment, the carbon-ceramic composite comprises, by volume, 10 to 60% of a carbon fibre network and 40 to 90% of a filler more preferably 30% of a carbon fibre network and 70% of a filler.

The overall composition, by end weight percent, comprises:

| Component | Range |
| --- | --- |
| Carbon fibre | 3–53 |
| Free carbon | 4–76 |
| Silicon carbide | 7–37 |
| silicon | 3–19 |
| silicon oxide | 3–19 |

The preferred ranges and actual weights will depend upon the carbon fibre content and the degree of impregnation. The porosity has no effect on the weight.

For a material produced from a starting material with a carbon fibre content of 30% by weight of the carbon-carbon composite, the carbon-ceramic composite will comprise (end weight percent):

| Component | Range | Preferred Range % | Preferred % |
| --- | --- | --- | --- |
| Carbon Fibre | 11–28 | 16–25 | 22,0 |
| Free Carbon | 15–59 | 30–55 | 46,8 |
| Silicon Carbide | 7–37 | 10–28 | 15,6 |
| Silicon | 3–19 | 5–14 | 7,8 |
| Silicon oxide | 3–19 | 5–14 | 7,8 |

For a material produced from a starting material, with a carbon fibre content of 10% by weight of the carbon-carbon composite after impregnation the carbon-ceramic composite will comprise (end weight percent);

| Component | Range % | Preferred Range % |
| --- | --- | --- |
| Carbon Fibre | 3–9 | 5–9 |
| Free Carbon | 23–76 | 41–71 |
| Silicon Carbide | 7–37 | 10–28 |
| Silicon | 3–19 | 5–14 |
| Silicon oxide | 3–19 | 5–14 | and, for a material produced from a starting material with a carbon fibre content of 60% by weight of carbon-carbon composite after impregnation the carbon-ceramic composite will comprise (end weight percent).

| Component | Range % | Preferred Range % |
| --- | --- | --- |
| Carbon Fibre | 22–53 | 32–50 |
| Free Carbon | 4–33 | 14–30 |
| Silicon Carbide | 7–37 | 10–28 |
| Silicon | 3–19 | 5–14 |
| Silicon oxide | 3–19 | 5–14 |

Of course, the relative end weight percentages of free carbon to silicon carbide in these embodiments could be decreased if more silicon were to be introduced into the system. Theoretically, the amount of free carbon could be reduced to zero (as per the first embodiment) in which case the amount of silicon carbide would well exceed the maximum figure given in this embodiment.

The carbon fibre network provides the friction engaging device with its good tensile properties and strength at high performance levels whilst the silicon carbide in the filler, provides the composite with its good wear, oxidation resistance and thermal properties. Such a device overcomes many of the problems associated with the prior art devices.

According to a third aspect of the present invention there is provided a friction engaging device in the form of a carbon-ceramic composite, preparable by substantially filling, by impregnation, a free carbon containing volume, defined as the volume between respective fibres of a carbon fibre network, with silicon under conditions whereby all or substantially all of the carbon fibre network remains as carbon fibre, and a proportion of the free carbon present in the volume is converted within the volume to silicon carbide by reaction with the silicon.

By impregnation is meant the ability to add material by liquid and/or gaseous infiltration and/or by chemical reaction eg. diffusion without a significant increase in physical size.

According to a further aspect of the present invention there is provided a method of producing a friction engaging device of the invention in which a carbon-carbon composite comprising 10 to 60% by weight of a carbon fibre network and from 40 to 90% by weight free carbon is impregnated with silicon under conditions such that substantially all of the carbon fibre network remains as carbon fibre, and a proportion of the free carbon present in the volume is converted within the volume to silicon carbide by reaction with the silicon.

Preferably about 10 to 35%, by volume, of the free carbon is converted to silicon carbide, more preferably still about 20% for a composite made by impregnating a 30% by volume carbon-carbon composite.

Preferably the friction engaging device is produced from a carbon-carbon composite with a density of 1.4 to 1.8 g/cm$^3$.

Preferably the carbon-carbon composite has an open porosity of 10–30%, more preferably still 15%.

Preferably, the carbon-carbon composite has a thermal conductivity in an axial and radial direction of at least 12 W/mK.

The carbon-carbon composite may comprise from 10 to 60% by weight of a carbon fibre network and from 40 to 900% by weight free carbon, any air (porosity) present in the structure having no effect on the weight.

If a braking disc according to the invention is made using the REFEL process, the carbon-carbon composite which is subjected to impregnation with silicon may comprise from 10 to 60% by weight of a carbon fibre network and from 90 to 40% by weight of free carbon.

During processing the volume which previously comprised free carbon and air is impregnated with silicon and the air content (porosity) thereby reduced, typically to about 5%. Since up to about 163%, and at least about 82% by weight silicon may be introduced into the volume by impregnating the open space (porosity) with silicon by the REFEL process the silicon can be reacted with a proportion of the free carbon to produce silicon carbide.

In practice about 430% to 78% by weight of the free carbon remains as free carbon, the remaining about 22 to 57% by weight being converted to silicon carbide for a composite made by impregnating a 30% by volume carbon fibre carbon-carbon composite. However not all the silicon introduced is converted into silicon carbide, some remains as silicon and some is converted to a silicon oxide.

The REFEL processing conditions are substantially as described in U.K. Patent Nos:1,437178 and 1,596303. However, it has been found that a silicon carbide seed is not essential to initiate the process to form the device of the present invention.

In one embodiment of the present invention a friction engaging device is produced as follows:

A carbon-carbon composite, such as that used in the manufacture of braking discs used in the aircraft and Formula One Racing Car industries, with a density between 1:4 and 1:8 g/cm$^3$, an open porosity between 10% and 30% and a thermal conductivity of at least 12 W/mK in the axial and in any radial directions, was machined to a desired shape by, for example, milling, grinding and turning. The carbon-carbon composite was thoroughly dried and silicon introduced substantially as per the REFEL process, the shaped carbon-carbon composite friction engaging device or a part therefore being placed in a refractory crucible with elemental silicon and subjected to heat (over 1600° C.) in an inert atmosphere (i.e. Argon) or under vacuum. By melting elemental silicon in the presence of the shaped carbon-carbon composite, the liquid, and vapour silicon, penetrates the volume via the open pore structure between the carbon fibre network, and a proportion of the free carbon, but unexpectedly not the carbon fibres, is converted into silicon carbide.

BRIEF DESCRIPTION OF THE DRAWINGS

The structure of the carbon-ceramic composite is most clearly illustrated in FIGS. 1 to 3 which are photomicrographs of the composite.

DETAILED DESCRIPTION

Figure 1:
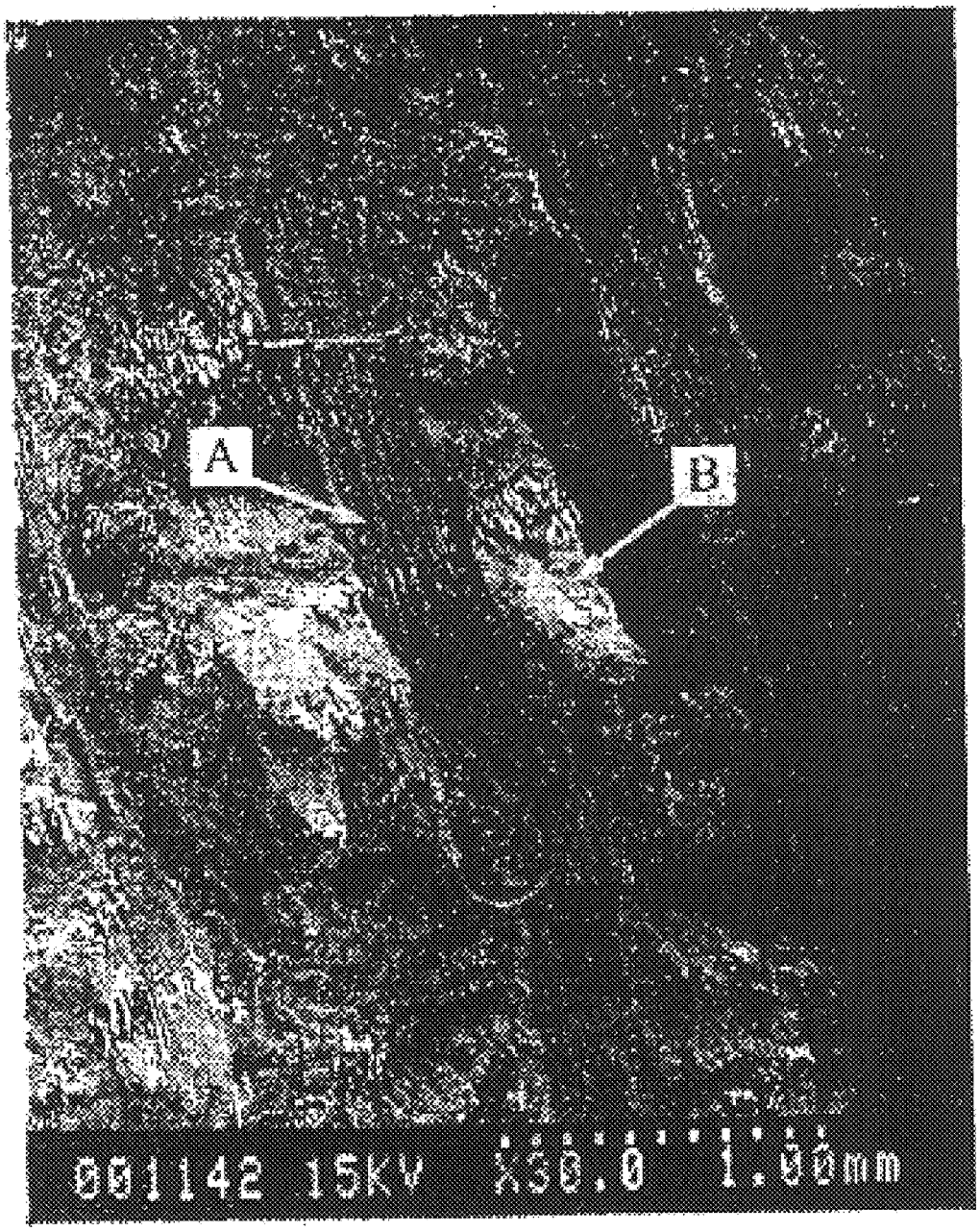
FIG. 1 shows bundles (tows) of carbon fibres A with filler B coating the fibres.
Figure 2:
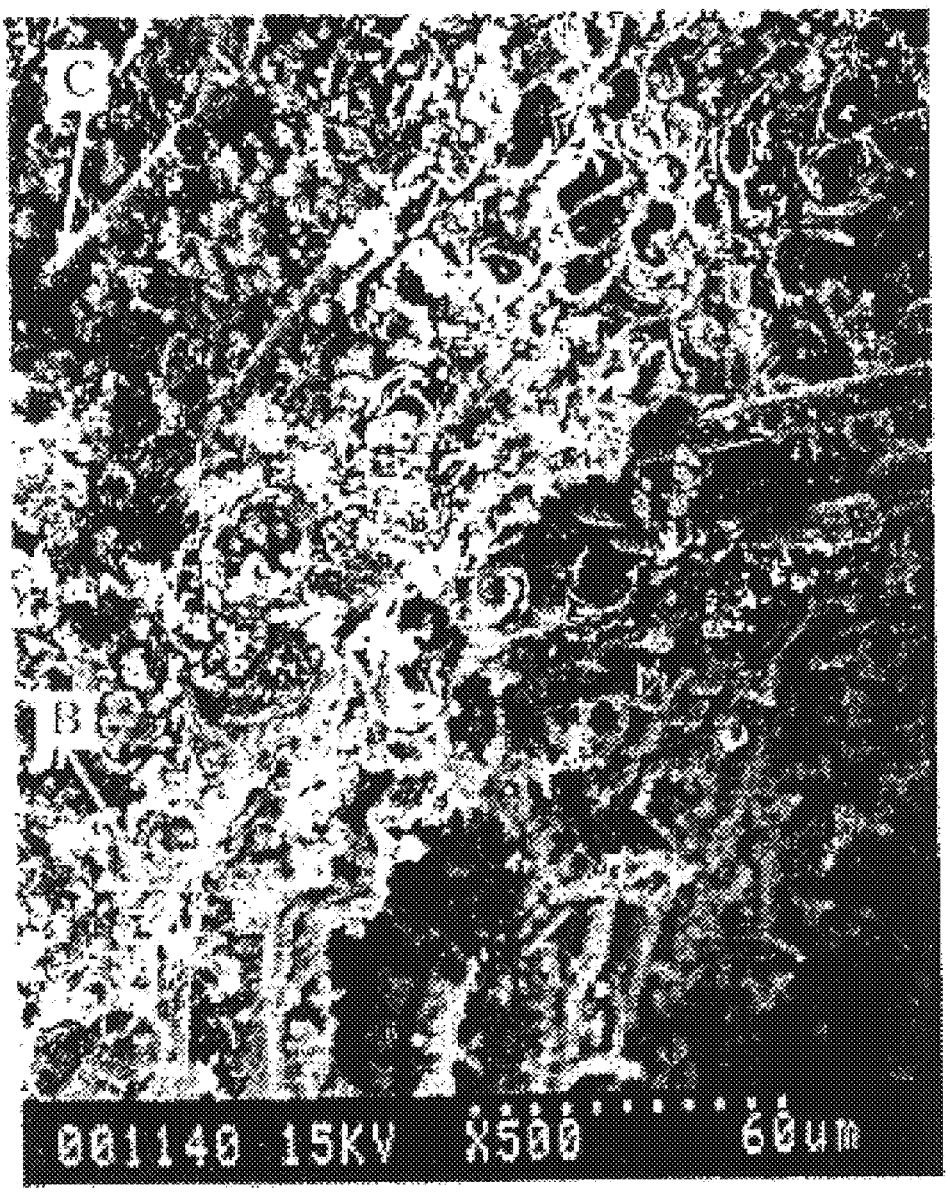
FIG. 2 shows distinct carbon fibres C with filler B coating the fibres and being dispersed throughout the structure.
Figure 3:
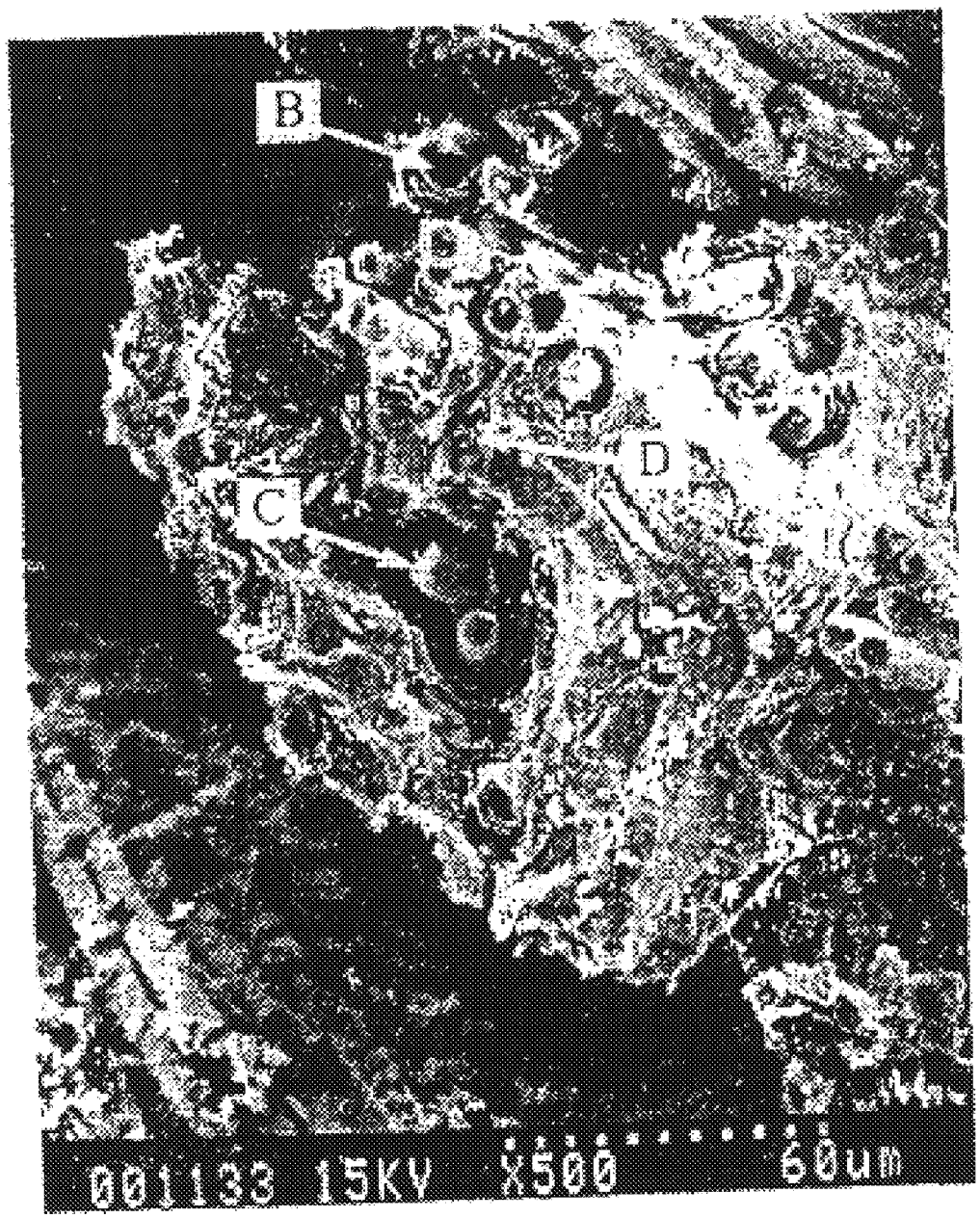
FIG. 3 shows the filler B forming a solid mass D about the fibres C.

The higher the porosity, the greater the conversion. The silicon carbide formed comprises a crystalline beta and alpha, though beta predominates, silicon carbide. The carbon-ceramic composite also comprises some unreacted silicon, a silicon oxide and unreacted carbon. Preferably silicon is introduced until there is no further weight gain in the product thereby indicating that the volume has been impregnated to its maximum. The resulting friction engaging device was then finished, by for example, grinding, and secured in a supporting structure eg. hub and web. If necessary, like parts are attached together on a supporting structure eg. hub and web, to form the desired braking disc.

The resulting products have the following advantages over the known friction engaging devices of the art:

Advantages

1) Stable coefficient of friction from 370 km/h (58 ms$^{-1}$ mean friction surface speed) to rest and from ambient to very high temperatures (at least 1000° C.)
2) (Non destructive) energy and power handling capability of up to 2½× a conventional steel brake (aircraft brakes can exceed the new technology but are destroyed in the process).
3) Acceptable wear (approx 2× the wear rate, at twice the duty, of conventional steel brakes, but much less than carbon-carbon composite), and
4) Light-weight compared to ferrous based brakes.

The present invention will be further illustrated, by way of example only, with reference to the following methods of production and comparative example:

EXAMPLE

Method of manufacture of a composition according to the invention.

Eight pieces of carbon-carbon composite material, manufacture by Carbone Industrie of France and designated SA3, were machined to shape. They were then processed by the REFEL (trade mark) process at 1750° C. in the presence of silicon metal to obtain a weight gain of 36.1±4.0%, each cycle lasting 30 hours and being repeated up to three times if necessary to obtain the desired-weight gain. The pieces were then ground to fit a BT2 steel carrier with four pieces per side, so that when constructed the assembly made a disc with a 640 mm outer diameter which was 100 mm thick. The assembly was mounted on a dynamometer shaft in a dynamometer and fitted with a caliper which held 400 cm$^2$, 48 mm thick, slotted pads composed according to the technology described in PCT WO 95/07418. On brake application the pads are forced onto the surface of the composite pieces. The braking disc successfully carried out stops of 38 and 44 MJ at a friction level of $\mu=0.32$ without incident and the braking disc substantially carried out further lower energy stops. For stops with energies between 0.1 and 26 MJ at various deceleration levels, an average friction level of $\mu=0.42$ was obtained with a disc wear rate of 62.5 MJ/cm$^3$. The equivalent values for steel/sinter technology are an average level of $\mu=0.40$ and 116 MJ/cm$^3$ disc wear rate at half the duty level of the aforementioned disc.

The dynamometer was set to run at full speed (1961 rpm) with an inertia of 10120 kgm$^2$ for braking from full speed to 1240 rpm and 9200 kgm$^2$ for braking from 1240 rpm to rest (this is a two stage brake application and is used on vehicles to control the deceleration from very high speeds). From full speed the brake was applied with 16.4 kN clamp force for the first stage and 15.2 kN for the second stage until the disc ceased to rotate. Throughout the brake application, the dynamometer monitored the speed, time, distance and inertia from which can be calculated the instantaneous friction coefficient, stop distance, braked mass, etc. Temperatures were also measured on the surface of the disc and on the steel structure beneath the composite pieces.

The energy dissipated during the brake application was 44 MJ. A coefficient of friction of $\mu=0.32$ was obtained for the first stage brake and $\mu=0.33$ for the second stage braking application. These values were stable throughout 95% of braking, the exceptions being at immediate brake entry and immediately before coming to rest. The maximum temperature reached by the composite was 850° C. and the carrier steel 350° C.

The results of the tests and comparisons against a standard steel braking disc for use on a train and a standard carbon-carbon braking disc for use in a clutch brake for an aircraft are set out in Table 1 below:

| Braking Disc Type | Test Type | Energy Per Unit Mass (MJ/Kg) | Energy Per Unit Volume (MJ/m$^2$) | Peak Power Per Swept Area (MW/m$^2$) | Emergency Average Deceleration (ms$^{-2}$) |
|---|---|---|---|---|---|
| Steel | For Train App. | 0.28 | 1.8 | 0.6 | 1.1 |

-continued

| Braking Disc Type | Test Type | Energy Per Unit Mass (MJ/Kg) | Energy Per Unit Volume (MJ/m$^2$) | Peak Power Per Swept Area (MW/m$^2$) | Emergency Average Deceleration (ms$^{-2}$) |
|---|---|---|---|---|---|
| Carbon Fibre reinforced ceramic | For Train App. | 0.37 | 1.8 | 1.2 | 1.1 |
| Carbon-carbon | For Aircraft | 2.21 | 4.0 | 4.5 | 4.4 |

Table 1 contrasts the energy per unit mass or volume of a braking disc and the power surface loading. It will be apparent thaw the braking disc of the present invention has more than double the energy handling capability of a steel braking disc.

The braking disc of the present invention, when used with a ceramic pad, showed a stable coefficient Of friction in dry conditions at temperatures up to 1500° C. At very high duties, which is where this technology can out perform any other known technology. a high temperature pad is required such as that disclosed in PCT WO 95/07418 which discloses a pad of friction material comprising at least 50% by weight of a ceramic material present in the form of relatively coarse particles of diameter 0.3 mm to 4 mm and a synthetic resin binder, together with a minor amount of a graphite lubricant and a minor amount of ceramic material in the from of relatively fine particles in the size range 1 to 30 microns. Furthermore, under wet braking (train brakes are currently fully exposed to the elements) friction values for a braking disc constructed according to the present invention are similar to those obtained in the dry, with wet/dry friction ratios ($\mu$ wet/$\mu$ dry) of 0.5 to 1.0 (which are equivalent to friction values of $\mu$=0.18 to $\mu$=0.39). The equivalent values for steel/sinter brake lining are wet/dry ratios of 0.33 to 0.62 [which are equivalent to friction values of $\mu$=0.13 to $\mu$=0.28].

Wear behaviour was also found to be adequate for this type of application due, it is believed, to a stable friction under "snub stop" conditions avoiding the high wear mechanisms seen with carbon fibre braking discs, and due to the greater abrasion resistance of ceramic and ceramic composites compared to carbons. At high temperatures (and therefore high energy stops) the oxidation resistance of silicon carbide is considered to be excellent and allows continuous use above 1200° C. with excursions up to 1700° C. being possible. Therefore the wear is low compared to known carbon-carbon constructions for all conditions. Compared to steel brake discs the wear behaviour of a brake disc according to the present invention is inferior (approx 2× the wear rate, at twice the duty) but will be acceptable to the train industry if 50% more wear allowance is provided in the manufacture of the component.

The device of the present invention thus offers the possibility of using carbon fibre reinforced ceramics across a wide spectrum of applications. In particular, it provides an opportunity for reducing the number, weight and bulk of braking discs for guided trackway vehicles, more particularly trains and their rolling stock, and provides an alternative which overcomes the problem of judder in aircraft braking discs, particularly at low taxiing speeds and may be useful for brake systems on other forms of transport, for example, cars, lorries etc.

Additional small scale samples were tested in order to investigate and optimise this new friction couple technology. Three materials were obtained, Cabone Industrie (France) SA3 designation, B. F. Goodrich (USA) ALC-15-V1 and ALC-15-V3 materials. These were all converted using the REFEL process and gained the percentage increases in weight shown in table 2 below.

The discs were then all subjected to the same test procedure which consisted of spinning the disc to 5000 rpm and applying a pad (with an area of 12.54 cm$^2$ and of a composition according to PCT WO 95/07418) under load for one minute, followed by cooling for six minutes or until the temperature fell below 150° C. The disc was driven under load and the speed was maintained at 5000 rpm, giving the effect of a drag brake.

The pad loads were; two drags at each of 150N, and 315N and thirty four drags at 485N, 675N and 810N. The total energy absorbed was 12 MJ. During testing torque and temperature was monitored, the latter being derived from a rubbing thermocouple placed on the disc brake surface at the effective brake radius. Both discs and pads (same pad type used for each test) were weighed prior to and after testing. The set and measured parameters were used to calculate energy absorbed, friction coefficient and wear rates for the pads and discs.

The characteristics of the materials are shown in Table 2 below:

| Material | Weight gain after processing % | Friction Range | Relative disc mass loss | Relative pad mass loss | Temp 'Max' Celsius |
|---|---|---|---|---|---|
| ALC-15-V1 | 12,8 | 0,26–0,46 | 0,91 | 0,63 | >>700 |
| ALC-15-V3 | 28,1 | 0,36–0,46 | 0,27 | 0,63 | 650 |
| SA3 | 21,6 | 0,36–0,39 | 1 | 1 | 540 | results shows that, although the friction coefficient range is larger for the ALC materials, the disc and pads wear a lot less than the SA3 material under the same test conditions.

What is claimed is:
1. A guided trackway vehicle friction engaging couple comprising a ceramic pad and a brake disc said ceramic pad having a composition different from the brake disc composition, said brake disc being formed of a carbon-ceramic composite comprising a carbon fibre network and a filler comprising silicon carbide, said brake disc comprising by weight,

| | |
|---|---|
| carbon fibre | 3–53%, |
| free carbon | 4–76%, |
| silicon carbide | 7–37%, |
| silicon | 3–19%, and |
| silicon oxide | 3–19%. |

2. A guided trackway vehicle friction engaging couple as claimed in claim 1, wherein said brake disc comprises by weight,

| | |
|---|---|
| carbon fibre | 11–28%, |
| free carbon | 15–59%, |
| silicon carbide | 7–37%, |
| silicon | 3–19%, and |
| silicon oxide | 3–19%. |

3. A guided trackway vehicle friction engaging couple as claimed in claim 2, wherein said brake disc comprises by weight,

| | |
|---|---|
| carbon fibre | 16–25%, |
| free carbon | 30–55%, |
| silicon carbide | 10–28%, |
| silicon | 5–14%, and |
| silicon oxide | 5–14%. |

4. A guided trackway vehicle friction engaging couple as claimed in claim 3, wherein said brake disc comprises by weight,

| | |
|---|---|
| carbon fibre | 22%, |
| free carbon | 46.8%, |
| silicon carbide | 15.6%, |
| silicon | 7.8%, and |
| silicon oxide | 7.8%. |

5. A guided trackway vehicle friction engaging couple as claimed in claim 1, wherein said brake disc comprises by weight,

| | |
|---|---|
| carbon fibre | 3–9%, |
| free carbon | 23–76%, |
| silicon carbide | 7–37%, |
| silicon | 3–19%; and |
| silicon oxide | 3–19%. |

6. A guided trackway vehicle friction engaging couple as claimed in claim 5, wherein said brake disc comprises by weight,

| | |
|---|---|
| carbon fibre | 5–9%, |
| free carbon | 41–71%, |
| silicon carbide | 10–28%, |
| silicon | 5–14%; and |
| silicon oxide | 5–14%. |

7. A guided trackway vehicle friction engaging couple as claimed in claim 1, wherein said brake disc comprises by weight,

| | |
|---|---|
| carbon fibre | 22–53%, |
| free carbon | 4–33%, |
| silicon carbide | 7–37%, |
| silicon | 3–19%; and |
| silicon oxide | 3–19%. |

8. A guided trackway vehicle friction engaging couple as claimed in claim 7, wherein said brake disc comprises by weight,

| | |
|---|---|
| carbon fibre | 35–50%, |
| free carbon | 14–30%, |
| silicon carbide | 10–28%, |
| silicon | 5–14%; and |
| silicon oxide | 5–14%. |

9. A guided trackway vehicle friction engaging couple as claimed in claim 1, wherein said brake disc is a train brake disc.

10. A guided trackway vehicle friction engaging couple as claimed in claim 1, wherein said pad comprises at least 50% by weight of a ceramic material present in the form of relatively coarse particles of diameter 0.3 mm to 4 mm and a synthetic resin binder together with a minor amount of a graphite lubricant and a minor amount of ceramic material in the form of relatively fine particles in the size range of 1 to 30 microns.

11. A guided trackway vehicle friction engaging couple as claimed in claim 1, wherein said brake disc has a porosity of about 5%.

12. A method of producing a guided trackway vehicle friction engaging couple as claimed in claim 1 in which said carbon-ceramic composite of said brake disc is made from a carbon-carbon composite comprising 10 to 60% by weight of a carbon fibre network and from 40 to 90% by weight free carbon, and said carbon-carbon composite is impregnated with silicon under conditions such that substantially all of the carbon fibre network remains as carbon fibre, and a proportion of the free carbon present in the volume is converted within the volume to silicon carbide by reaction with the silicon to thereby form said carbon-ceramic composite.

13. A method as claimed in claim 12, in which the carbon-carbon composite has a density of 1.4–1.8 g/cm$^3$, an open porosity of 10 to 30% and a thermal conductivity in an axial and radial direction of at least 12 w/mk.

14. A method as claimed in claim 12, in which from about 82% to about 163% by weight of silicon is introduced into the carbon-carbon composite.

15. A guided trackway vehicle friction engaging couple comprising;
  i) a braking disc in the form of a carbon-ceramic composite comprising a carbon fibre network whose volume has been impregnated with a filler comprising silicon that is subsequently converted to silicon carbide, and ii) a ceramic pad having a composition different from the composition of said braking disc.

16. A guided trackway vehicle friction engaging couple comprising a ceramic pad and a brake disc, said brake disc being formed of a carbon-ceramic composite comprising a carbon fiber network and a filler comprising silicon carbide, said ceramic pad having a friction surface and having a composition different from the composition of said brake disc and cooperating with said brake disc to provide emergency frictional engagement and continued normal frictional engagement thereafter without excessive wear.

17. A guided trackway vehicle friction engaging couple as claimed in claim 16, in which the carbon-ceramic composite comprises, by volume, 10 to 60% of carbon fiber network and up to 90% of filler.

18. A guided trackway vehicle friction engaging couple as claimed in claim 16, in which the carbon-ceramic composite comprises, by volume, 10 to 60% of carbon fiber network and 40 to 90% of filler.

19. A guided trackway vehicle friction engaging couple as claimed in claim 18, in which the carbon-ceramic composite comprises, by volume, 30% of carbon fiber network and 70% of filler.

20. A method of stopping a guided trackway vehicle comprising providing a friction engaging couple as set forth in claim 16, and operating said device to engage said composite with said friction surface to reduce the speed of said vehicle by converting kinetic energy to heat.

21. A guided trackway vehicle comprising a guided trackway vehicle friction engaging couple as claimed in claim 1.

22. A guided trackway vehicle comprising a guided trackway vehicle friction engaging couple as claimed in claim 10.

* * * * *